United States Patent
Robinson et al.

(10) Patent No.: US 9,219,883 B2
(45) Date of Patent: Dec. 22, 2015

(54) CONTROLLING PLACESHIFTED CONTENT

(75) Inventors: David Robinson, North Yorkshire (GB); Robert Wadey, West Yorkshire (GB)

(73) Assignee: EchoStar UK Holdings Limited, Steeton (GB)

(*) Notice: Subject to any disclaimer, the term of this patent is extended or adjusted under 35 U.S.C. 154(b) by 0 days.

(21) Appl. No.: 13/397,243

(22) Filed: Feb. 15, 2012

(65) Prior Publication Data

US 2012/0216236 A1 Aug. 23, 2012

(30) Foreign Application Priority Data

Feb. 15, 2011 (EP) ...................................... 11154517

(51) Int. Cl.
*H04N 7/18* (2006.01)
*H04N 7/16* (2011.01)

(52) U.S. Cl.
CPC ....................................... *H04N 7/16* (2013.01)

(58) Field of Classification Search
CPC .................... H04N 21/43615; H04N 21/4367; H04N 7/106; H04N 7/17354; H04N 7/17363; H04N 7/1675; H04N 21/23476; G11B 20/00086
USPC ......... 725/74, 78, 80, 110, 133, 141; 709/231
See application file for complete search history.

(56) References Cited

U.S. PATENT DOCUMENTS

| | | | |
|---|---|---|---|
| 6,263,503 B1 | 7/2001 | Margulis | |
| 7,647,614 B2 | 1/2010 | Krikorian et al. | |
| 7,802,306 B1 | 9/2010 | Adams et al. | |
| 8,266,657 B2 | 9/2012 | Margulis | |
| 2003/0081776 A1* | 5/2003 | Candelore | 380/200 |
| 2005/0034171 A1* | 2/2005 | Benya | 725/143 |
| 2006/0051055 A1* | 3/2006 | Ohkawa | 386/46 |
| 2006/0095471 A1 | 5/2006 | Krikorian et al. | |
| 2010/0005483 A1* | 1/2010 | Rao | 725/25 |
| 2010/0071076 A1* | 3/2010 | Gangotri et al. | 726/32 |

OTHER PUBLICATIONS

European Patent Office "Extended European Search Report" mailed Aug. 12, 2011; European Patent Appln. No. 111545174.4.

* cited by examiner

*Primary Examiner* — Yassin Alata
(74) *Attorney, Agent, or Firm* — Ingrassia Fisher & Lorenz, P.C.

(57) ABSTRACT

Media content to be place shifted is received at the local user device along with a place shift enabled parameter that contains data associated with the received media content and that indicates whether the received media content is authorized to be place shifted. A user command to place shift the received media content to the remote user device is also received. It is then determined, by analyzing the place shift enabled parameter, whether the received media content is authorized to be place shifted and based on this determination the place shifting of the received content to a remote device is allowed or impaired.

19 Claims, 4 Drawing Sheets

CONTROLLING PLACESHIFTED CONTENT

TECHNICAL FIELD

This invention relates to a system and a method for controlling the output of content from a device, and in particular from a person media broadcasting system that streams media content from a source to a user device over a network; this often being referred to as "place shifting" the media content.

BACKGROUND

"Place shifting" is a technology which allows content from a first device to be re-transmitted over a network to a second device, enabling the content to be consumed at a location remote from the first device. The user at the remote location can control the first device using an interface to the second device which causes the second device to transmit commands back over the network to the first device. Typically a third device interfaces between the first device and the network to provide the place shifting technology, and is sometimes referred to as a place shifting device.

Place shifting devices are known that enable place shifting over a computer network, allowing a user to view and control media sources over a computer network from a remote location. A place shifting system may include a place shifting device and a place shifting player. The place shifting device may be configured to receive as an input virtually any media source. The broadcaster digitizes and compresses the received media content (if necessary) and streams the media over a computer network to the place shifting player. The place shifting player may reside on any of a wide range of client devices for viewing the media. A user may send control commands (e.g., "channel up") using the place shifting player back over the network to be executed by the media source device, thus affecting the media stream received by the place shifting player. An example of a place shifting device and system is described in US Patent Application US 2006/0095471 which is hereby incorporated by reference.

A common use of "place shifting" is as follows. The first device is a television set top box (STB), receiving audio and video content. The second device can be a laptop PC, a mobile phone, or any similar device with a suitable display/output, network connection, and place shifting software (collectively, known as a place shifting player). The network is an IP or other network, for example a home network, WiFi, LAN, the open internet, or some combination of these. The third device is a dedicated place shifting device, which takes the analogue video output from the STB, and encodes it for transmission over the network. It also receives the commands from the place shifting player, and may transform these into infra red remote control codes, controlling the STB in the same way as its own standard remote control. The place shifting device may have multiple inputs, and multiple infra red remote control modules, thus allowing multiple audio and video sources to be place shifted and controlled at will, including video recorders, disc players, home security cameras, etc. A key element of the place shifting technology is that the audio and video encoding used to transmit the content over the network is adapted dynamically to match the bandwidth that is available on the network. Place shifting systems typically allow content to be provided to one remote device at a time.

In this way, people may watch the television channels received at their home whilst travelling away from home. They may also watch the programmes recorded onto their digital video recorder, and even control the device to schedule recordings to be made in the future. In short, any functionality that is available when using the STB within the home can be replicated at the remote location using place shifting technology.

Place shifting technology may be provided by a separate box attached to the STB via its analogue video outputs as described above. However, it is possible to integrate the STB functionality and a place shifting device or unit, which provides the place shifting functionality, into a single unit—a place shifting set top box (PS-STB). There is also the possibility of accessing higher quality digital video within the STB, rather than video that has been degraded by the conversion from digital to analogue in the STB, and then re-converted from analogue to digital in a separate place shifting device. Typically, where the place shifting functionality is combined with a STB the media content to be place shifted remains in the digital domain, and is usually re-encoded, often to a far lower bit rate, and often using a different codec to the original, broadcast, encoding scheme before being place shifted.

There is a potential drawback to integrating the place shifting device functionality and STB functionality into a single PS-STB. STBs are often sold directly to Pay-TV operators for them to supply to their customers/subscribers. These same Pay-TV operators may wish to control the conditions under which content can be place shifted.

SUMMARY

The invention is defined in the claims to which reference is now directed. Advantageous features are set forth in the dependent claims.

Embodiments of the invention provide a method for controlling the place shifting of media content from a local user device, such as a set-top-box, comprising a place shifting unit or device for place shifting media content over a network to a remote user device for outputting content to a user. According to the method media content to be place shifted is received at the local user device along with a place shift enabled parameter containing data associated with the received media content and indicative of whether the received media content is authorised to be place shifted. A user command to place shift the received media content to the remote user device is also received. It is then determined, by analysing the place shift enabled parameter, whether the received media content is authorised to be place shifted and based on this determination the place shifting of the received content to a remote device is allowed or impaired.

Allowing or impairing the place shifting of the received content may include allowing or preventing the place shifting of the received content to the remote user device, such that the local user device does not output the content for place shifting. Alternatively, it may include marking the place shifted content, for example with a watermark, but still place shifting it, such that the remote user device can determine whether the content should have been place shifted and take action to allow or prevent the display of the place shifted content.

Preferably, a condition parameter containing data indicative of one or more further conditions that must be met in order for received media content to be place shifted by the local user device is received at the local user device. The method then further includes the steps of determining, by accessing a database and comparing data from the database with the condition parameter, whether the one or more further conditions are met. In such a method the step of allowing or impairing place shifting is further based on whether the one or more further conditions are met. A suitable condition that must be met may include the local device and the remote device being based in the same predetermined authorised domain, in which case the method further comprises the step of determining whether the local device and the remote device are within the same predetermined authorised domain, preferably by monitoring the network address translation (NAT) traversal across a home gateway of the local device, and if so, allowing place shifting of media content. Another condition that may also, or alternatively, need to be met includes the user having paid an adequate amount to receive the place shifted content at the remote device. In this case, the method may further comprise the steps of receiving, from a database, data indicative of whether the user has paid for the service and, if it is determined that the user has paid for the service, allowing place shifting of media content.

Preferably, if the place shifting of the received content is determined not to be permitted, a caption is sent to the remote user device for display indicating one or more actions for the user to follow to activate place shifting functionality. This may include directing the user to contact a billing centre, or providing a link on the user device to a website at which the appropriate service can be purchased.

Preferably, the local user device also comprises a memory for storing media content for later viewing. When applied to such devices the method may further comprise the steps of storing received media content on the memory along with the place shift enabled parameter data associated with the received media content. When a command is received to place shift the stored media content it may be determined, by analysing the associated data, whether the stored media content is authorised to be place shifted and place shifting of the stored content to the remote user device may be enabled or disabled based on the determination. Any associated condition parameter may also be stored, and checks may be made to ensure that the appropriate conditions are met to place shift the stored media content.

In order to confirm whether or not media content can be place shifted or not, the method may further involve, based on the determination step, encoding in the received media content, preferably by applying a watermark, data indicative of whether the received media content is authorised to be place shifted. This watermark can be provided to a remote user device as an indicator of whether the received content should be place shifted or not. The method may further comprise the step of encoding, in the received media content, preferably by applying a second watermark, further data related to a message for display to a user, preferably being a code associated with a message stored on another device. This can be provided in addition to or instead of the caption mentioned above. Preferably the first watermark is encoded in a media content video component and the second watermark is encoded in a media content audio component or vice versa.

After the user has paid for media content to be place shifted the place shift enabled parameter will change from indicating that content cannot be place shifted to indicating that it can. The method may further include sending a re-enable signal to the remote user device that causes the place shifted content to be displayed on the remote device when the place shifting service has been paid for, or another condition is met. This re-enable signal preferably overrides the place shift enabled parameter in the remote user device such that in response to the re-enable signal the remote user device begins playing the place shifted content.

When the place shift enabled parameter indicates that the received media content cannot be place shifted, the method may further include the step of altering the place shift parameters of the video and/or audio such that the further data, or the re-enable signal, are received and decoded at the remote user device at a higher rate than the place shift parameters used during normal place shifting operation. Altering the place shift parameters preferably includes increasing or decreasing any of the video resolution and frame rate and the audio encoding rate.

The place shift enabled parameter preferably comprises at least one bit located in broadcast metadata and particularly one or more of the usage state information (USI), EMM, ECM, private data or content license data or a DVB carousel.

A computer program may be provided for causing a local user device to execute the any of the method steps described above.

Embodiments of the invention provide a local user device for controlling the place shifting of content to a remote user device over a network. The user device comprises a personal broadcast unit or device for place shifting received media content and one or more inputs for receiving media content; a place shift enabled parameter, containing data associated with the received media content and indicative of whether the received media content is authorised to be place shifted; and a user command to place shift the received media content to the remote user device. A network connection provides the media content to the remote user device. A processor is provided that is operable to analyse the place shift enabled parameter associated with the received media content and to determine whether the content is authorised to be place shifted, and to issue a command to allow or impair the place shifting functionality depending upon the determination.

The processor command may enable or disable the place shifting of the received content to the remote user device, such that the local user device does not output the content for place shifting. Alternatively, the processor command may cause the place shifted content to be marked such that the remote user device can determine whether the content should be place shifted and take action to allow or prevent the display of place shifted content.

The local user device preferably also comprises an input for receiving a condition parameter containing data indicative of one or more further conditions that must be met in order for received media content to be place shifted by the local user device. The processor may be further operable to access a database and compare data from the database with the condition parameter to determine whether the one or more further conditions are met, and to determine whether place shifting of the content is authorised based on whether the one or more further conditions are met. A condition may be that the local and remote devices are within the same domain, in which case the local user device may be configured to determine if it is in the same predetermined authorised domain as the local user device, preferably by monitoring the network address translation (NAT) traversal across a home gateway of the local device, and if so, allowing place shifting of media content and to prevent the display of received place shifted content if it is not in the same domain. Another condition may also, or alternatively, be that the user has paid a sufficient amount to receive the required place shifting service. The device may therefore be further configured to receive, from a database, data indicative of whether the user has paid for received place shifted content and, if it is determined that the user has paid for the service, allow the display of place shifted media content.

The local user device may further comprise a caption generator arranged to place shift a caption containing a message to the remote user device for display indicating procedures for the user to follow to activate place shifting functionality if the place shifting of the received content is not permitted.

The local user device may include a memory for storing media content and associated place shift enabled parameters, the processor being further arranged to determine, by analysing the associated stored place shift enabled parameter, whether stored media content is authorised to be place shifted; and allowing or impairing place shifting of the received content stored on the memory to the remote user device based on the determination. Any associated condition parameter may also be stored, and the device arranged to check that the appropriate conditions are met to place shift the stored media content.

The local user device may further comprise a watermark generator arranged to encode, in received media content, data indicative of whether the received media content is authorised to be place shifted based on the determination made by the processor. A second watermark generator may be included, the second generator arranged to encode in the received media content further data related to a message for display to a user, preferably being a code associated with a message stored on another device. One of the watermark encoders may be arranged to encode a watermark in a media content video component and one of the watermark encoders may be arranged to encode a watermark in a media content audio component.

The local user device may be embodied in a set-top-box, or a place shifting set-top-box.

A method is also provided for controlling the place shifting of content from a local user device, comprising a place shifting unit or device for place shifting media content over a network to a remote user device for outputting content to a user. The method comprises the step of receiving, at the remote user device, place shifted media content from a local user device over a network and an indicator, such as a watermark encoded in the place shifted media content, associated with the received media content and indicative of whether the received media content is authorised to be place shifted. The method also includes determining, by analysing the indicator, whether the received media content is authorised to be place shifted; and allowing or impairing the output of content if the received media content is not authorised to be place shifted.

Where the indicator is a first watermark, the method may further comprise the step of detecting, at the remote user device, whether the first watermark is present or not, the presence or absence of the watermark being indicative of whether the received media content is authorised to be place shifted. The method may also include the step of receiving, encoded in the received media content, an additional watermark containing further data related to a message for display to a user. If the further data simply includes the message then this can be displayed on the user device. However, the further data may include a code linking to a message stored on a database, in which case the method may further comprise the steps of connecting to a database, submitting the further data, and receiving a message from the server and displaying the message to a user.

If the first watermark indicates that content is not authorised to be place shifted, the video component of the media content may be prevented from being output at the remote user device, but the audio component of the media content may still be output at the remote user device for a period of time or vice versa.

When the indicator changes from indicating that content cannot be place shifted to indicating that it can, the method may include receiving a further watermark at the remote user device having a re-enable signal instruction encoded therein that causes the place shifted content to be displayed on the remote device. The re-enable signal may override the indicator.

When the indicator indicates that received media content cannot be place shifted, a command may be sent by the remote user device to the local user device to alter the place shift parameters of the video and/or audio such that the further data, related to a user message, or the re-enable instruction, are received and decoded at the remote user device at a higher rate than the place shift parameters used during normal operation, that is, when the local device is place shifting content to the remote device for viewing. This may include increasing or decreasing any of the video resolution and frame rate and the audio encoding rate.

A computer program may be provided for causing a remote user device to execute the method of any of the method steps described above.

Embodiments of the invention also provide a corresponding remote user device for controlling the place shifting of content received from a local user device over a network, the remote user device being arranged to receive place shifted content. The remote user device, such as a laptop or mobile phone, comprises one or more inputs for receiving place shifted media content from a local user device, such as a PS-STB, over a network and an indicator associated with the received media content and indicative of whether the received media content is authorised to be place shifted. The device also comprises a processor operable to analyse the indicator and to determine whether the content is authorised to be place shifted, and to issue a command to impair the output of content if the received media content is not authorised to be place shifted.

Preferably the remote user device comprises a watermark detector for detecting, in the received media content, an indicator encoded in a watermark in the place shifted media content. If the indicator is a first watermark, the processor may be arranged to impair the output of received content if a suitable watermark is detected or not, the presence or absence of the watermark being indicative of whether the received media content is authorised to be place shifted.

An additional watermark may also be received by the remote device, which may further comprise a watermark detector for detecting, in the received media content, the additional watermark containing further data related to a user message for display to a user containing the actions required to place shift the received media content. The remote user device may further comprise a connection to a database, the processor being operable to connect to the database, submit the further data, and retrieve a message from the database and display this message to a user.

Preferably, in the event that the first watermark indicates that content is not authorised to be place shifted, the processor is operable to prevent the video component of the media content from being displayed, and further operable to display the audio component of the media content for a period of time or vice versa.

Preferably the remote user device is arranged to receive a further watermark at the remote user device having a re-enable instruction encoded therein that causes the place shifted content to be displayed, the re-enable instruction overriding the place shift indicator.

Preferably the remote user device is configured to determine if it is in the same predetermined authorised domain as the local user device and to prevent the display of received place shifted content if it is not in the same domain. This can be achieved by monitoring the IP address of the remote device and/or the local device, or by receiving location information at the remote device, if the domain is geographical.

Embodiments of the invention may further provide a method of broadcasting content to one or more local user devices for subsequent broadcast to a remote user device over a network. The method comprises the steps of encoding media content for broadcast; combining with the encoded media content, within a transport stream, associated data indicative of whether the received media content is authorised to be place shifted; and broadcasting the transport stream to the one or more local user devices.

A corresponding head end system may be provided for broadcasting content to one or more local user devices for subsequent broadcast to a remote user device over a network. The head end system comprises an encoder for encoding media content for broadcast and combining with the encoded media content associated data indicative of whether the received media content is authorised to be place shifted; and a broadcast output for broadcasting the transport stream to the one or more local user devices.

BRIEF DESCRIPTION OF THE DRAWINGS

Examples of the invention will now be described in more detail, with reference to the drawings in which.

DETAILED DESCRIPTION OF THE EXAMPLE EMBODIMENTS

Figure 1:
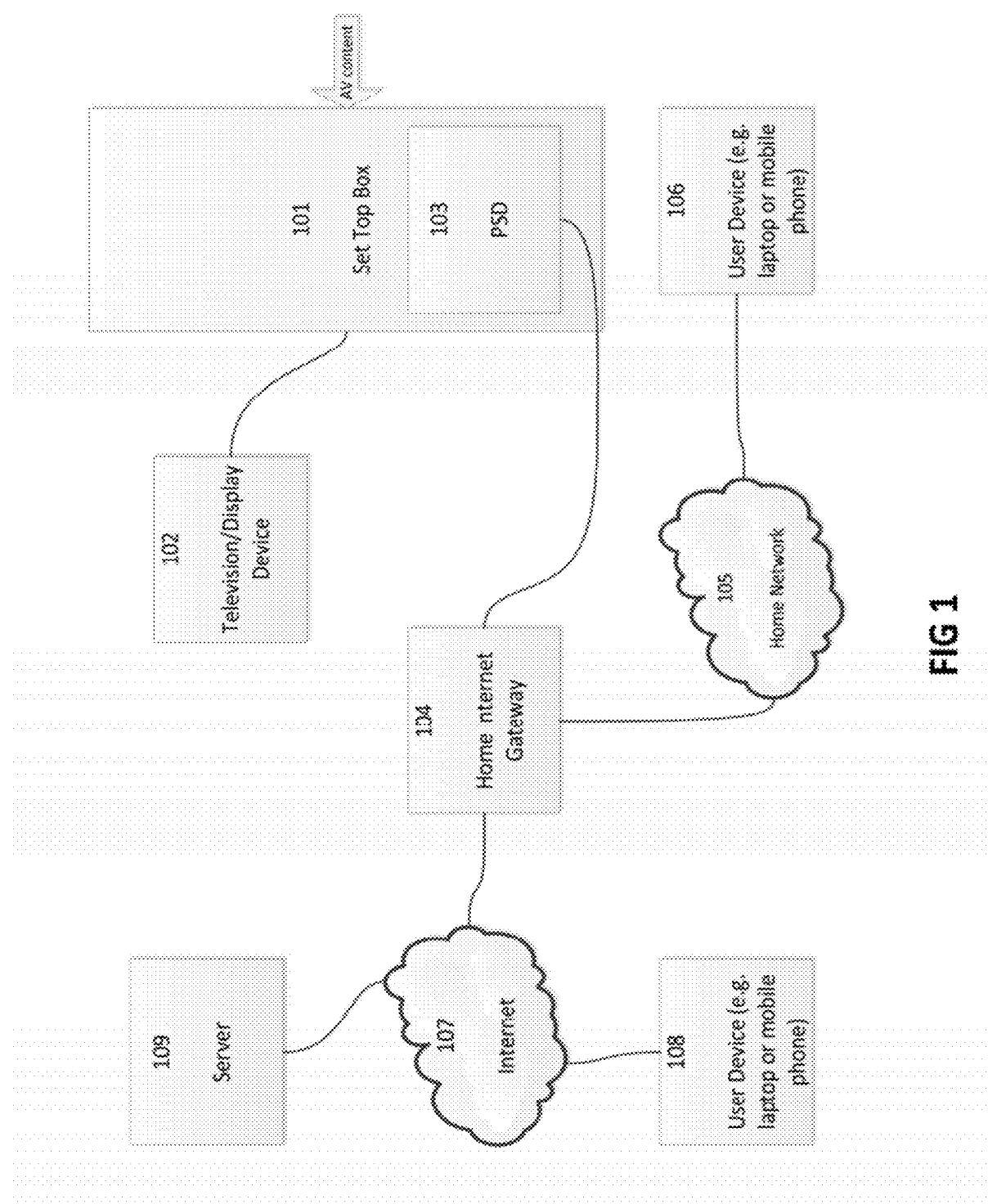
FIG. 1 is a diagram of a media broadcasting system in which the present invention may be utilised.

FIG. 1 shows a block diagram of a media broadcasting system in which the present invention may be utilised. A set-top-box (STB) 101 receives media content containing video and/or audio data. The set-top-box decodes the media content and provides, as an output, an analogue or digital signal that can be provided to a display device such as a television 102.

In addition, the set-top-box includes a place shifting device (PSD) 103, making the STB 101 a PS-STB. The PSD receives the AV content, preferably in digital form, and streams digitally compressed content to a home internet gateway 104. The home internet gateway provides connectivity to a local network and/or a remote network such as the internet and in particular may comprise a router, a switch or hub, and/or an analogue, DSL, cable or other type of broadband modem. These elements may be combined into a single device.

A local network, or local area network 105 will typically connect or couple to one or more user devices 106 in a user's home, for example the user may have one or more of a laptop, an internet enabled phone, a PDA, a tablet computer, an internet enabled TV, a desktop computer and any other device capable of receiving and playing a media stream over a network. The devices may connect to the local network by a wired connection or a wireless connection. The PSD 103 provides content to the user devices 106 via the home network 105. The PS-STB may be connected directly to the home network 105 rather than, or as well as, the home internet gateway 104. Both the home internet gateway and the home network connection device may be provided in the same device, for example broadband routers may perform both functions. The home internet gateway could be located in the PS-STB, this being common in the case of cable STBs where the internet connection and video content are provided along the same cable in different formats and frequency ranges.

In addition, the media streams created by the PSD may be provided to user devices over the internet 107 or over any other type of network including wide area mobile networks (e.g., GPRS, EDGE, 1X-RTT, 1x-EvDO, and FOMA 2.5G and 3G cellular networks), WiFi and other public broadband access locations, WiMAX networks, other LANSs (such as at work, school, or a friend's home), and direct connections to other internet service providers. As with the local user devices 106, the remote user devices 108 may include any number of device types, such as desktop and notebook PCs, Web tablets, PDAs, embedded clients built expressly for the purposes of decoding the streams of the personal broadcaster, and other devices capable of receiving and/or playing a media stream over a network.

The AV content provided to the set-top-box 101 is provided by a broadcasting entity. The broadcasting entity, or some other entity, may not wish for content to be redistributed in the place shifting manner described above.

Before AV content is broadcast it is typically first encoded, by an encoding unit, according to a particular encoding scheme, such as MPEG and particularly MPEG 2 or MPEG 4. A multiplexer may be used to multiplex a number of encoded AV streams into a single transport stream. A conditional access system (CAS) may also be provided if the broadcaster wishes to charge for content to be viewed. The CAS encrypts particular portions of the transport packets such that the content delivered by the broadcaster cannot be viewed without the correct access rights. In addition, the CAS adds further data to the transport steam. These are the Entitlement Control Messages (ECM) and Entitlement Management Messages (EMM). Together these control the ability of users to watch scrambled content.

In addition to this data, the broadcaster system also defines and introduces to the transport stream one or more further parameters. The first parameter is a parameter indicative of whether the media content with which it is associated, such as a particular programme, can be rebroadcast or place shifted by the PSD. This parameter can be referred to as the "place shift enabled" parameter.

Upon receipt of a transport stream the STB demodulates the stream, de-multiplexes to obtain the individual transport stream and decrypts the content using the relevant conditional access data. A further check is then performed to detect whether the place shift enabled parameter indicates if content should be allowed to be rebroadcast or not. If the place shift enabled parameter indicates the content can be rebroadcast by the PSD then the PSD functions as normal, forwarding the content to other user devices on command from the user. If the place shift enabled parameter indicates that the associated content should not be rebroadcast by the PSD then the STB prevents this from occurring.

The place shift enabled parameter may be a bit, or series of bits, located in the usage state information (USI), EMM, ECM, private data or content license data or a DVB carousel. The USI is metadata that signals the authorised usage of content to which it is securely bound. The place shift enabled parameter may comprise a bit that, when set, indicates that the content with which that bit is associated can be forwarded on by the PSD. A logic 0 or 1 may be used to indicate the content can be rebroadcast, the opposite logic state indicating that the content cannot be rebroadcast.

When the STB determines that the place shift enabled bit associated with a particular piece of media content is set to indicate that this content should not be forwarded or rebroadcasted by the PSD the processor is arranged to control the PSD and prevent it from rebroadcasting the particular content, for example by disabling the PSD or one or more of its outputs.

The place shift enabled parameter gives the controlling entity control over whether content can be rebroadcast by a PSD. However, the content provider may wish to allow their content to be rebroadcast if certain conditions are met. To this end, a second parameter can be added to the broadcast data, within the USI, EMM, ECM or any of the data locations possible for the first parameter. The second "condition" parameter indicates the condition or conditions required to be met if the content is going to be rebroadcast.

A condition that may need to be met could be sufficient payment for the content. The content provider/broadcaster may only allow content to be rebroadcast by the PSD if the user has paid for this service. The second parameter may indicate the amount of payment required for this service. The STB is programmed to detect this second parameter and to determine whether the user has provided sufficient payment. In particular the STB may be arranged to connect to a database using a data connection, such as an internet connection, to access subscription or payment data. The database contains information indicative of whether the user has paid a sufficient amount to allow them to rebroadcast the particular content using the PSD. The second parameter may indicate a specific amount that needs to be paid or it may indicate a tier within which that content resides. The STB, when accessing the payment database, may then look up the relevant tier for the appropriate amount that needs to be paid.

The first and second parameters may be applied to individual programmes or media content, or may apply to a collection of programmes, such as a particular series, or a particular channel, such that the user can pay for, or subscribe to a particular channel or series and place shift this content if they wish. The parameter information may be broadcast globally in all broadcasts, on a per-channel basis, or on a per-second (or other unit of time) basis.

If the STB determines that the correct amount has been already paid for the right to rebroadcast the specified content then the PSD is allowed to proceed as normal. If, on the other hand, the payment database indicates that correct payment has not been made, the STB processor issues a command to the PSD, or other component such as an output controller, to prevent the PSD from rebroadcasting the associated media content.

Optionally, in the event that correct payment to rebroadcast the relevant content has not been made, the STB may be arranged to interface with a billing centre to initiate payment for the right to rebroadcast the content.

STBs, as well as containing a PSD for rebroadcasting content to a user, may also contain a memory, such as a hard drive, for storing programme/media content to be played back at a later time. This may be referred to as digital video recorder (DVR) or personal video recorder (PVR) functionality. In addition to storing the relevant media content for later playback, the STB also stores the parameter information, for example by storing all or portions of the USI. When the STB is operating in DVR mode and the user instructs the PSD to rebroadcast content from the hard drive the STB can be arranged to determine whether the relevant parameters are set. That is the STB can check, from the onboard memory, whether that content can be rebroadcast, and if requirements need to be met to do so, by checking the associated USI data and particularly the data relating to the first and preferably also the second parameters mentioned above. In the same manner as described above when broadcasts are received and streamed to the remote user device, the STB will not forward or rebroadcast content if the stored parameters indicate that this should not be allowed.

A more detailed example of an embodiment of the invention will now be provided. There are four main components or systems that will be described. The head end is a system located at the broadcaster. A place shifting STB, or PS-STB, is an STB with built in PSD to provide place shifting functionality. A stand alone PSD is a self contained or separate PSD. A place shifting player is any user device able to receive and display place shifted content, and could be, for example, a smart phone running appropriate software, or a computer accessing an appropriate web browser plug-in, etc. Various processing is added to the software or plug-in such that it can enforce restrictions applied by embodiments of the present invention.

Figure 2:
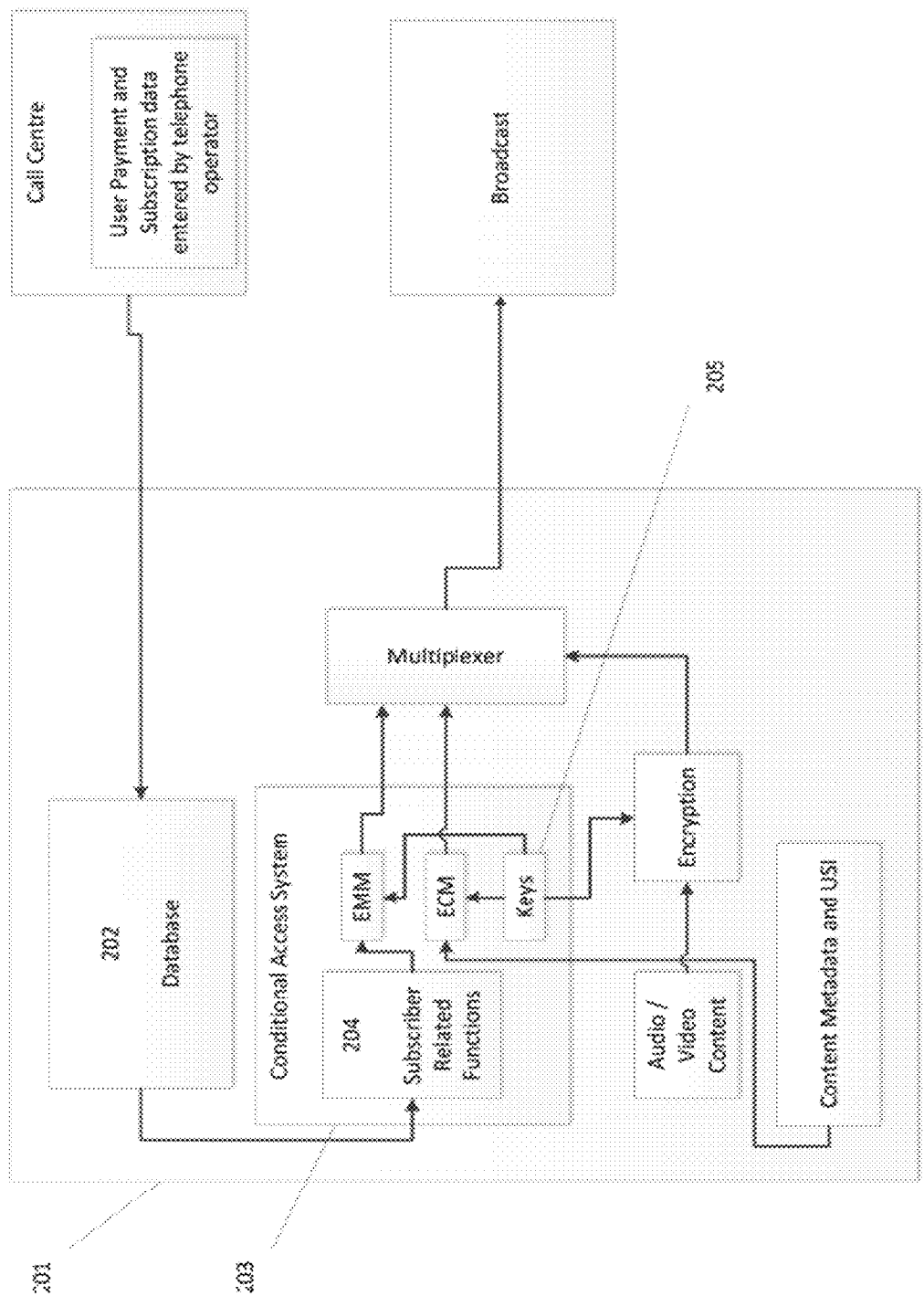
FIG. 2 is a diagram of a head end system in accordance with an embodiment of the invention.

FIG. 2 shows a simplified diagram of a head end system 201 in accordance with an embodiment of the invention. For the avoidance of doubt, some functions are not shown, and others have been combined for clarity. For example, key generation and management may be more complex than shown and multiple video and audio streams (i.e. television channels) may be multiplexed together. A common data format for digital television broadcasting is the MPEG-2 Transport Stream (MPEG-2 TS). This stream consists of a series of packets, each being 188 bytes in length, plus error correction. Each packet includes a packet identifier (PID), which signals the contents of the packet. The contents may be, by way of example, video, audio, a standard table of data (e.g. listing the PIDs for the video and audio of a TV channel), or some private data (e.g. some non-standard data used for a particular service in a given environment).

A standard table known as the program map table (PMT) lists the PIDs of the video and associated audio stream(s), along with any other corresponding data required, which form a single TV channel. Another standard table, known as the program association table (PAT), has a fixed PID itself, and lists the PID(s) of the PMT(s).

In this way a number of separate TV channels may be multiplexed into a single stream of data, together with all the additional information needed to present any of the channels to a viewer with the correct video, audio and programme information, and the like.

In a Pay-TV network, the media content itself (video etc) is encrypted, and certain rights, including usage state information (USI) are associated with that content using a head end conditional access system (CAS) 203. The ability to decrypt the media content and enforce these rights is provided by corresponding conditional access system functionality in the STB. The keys 205 for decrypting the content, along with some USI, are carried in the entitlement control messages (ECMs), which are associated with a given programme in its PMT. An ECM is typically transmitted every few seconds. Information on what services, for example television channels, the subscriber can access is carried in the entitlement management messages (EMMs), which are associated with a given subscriber or group of subscribers, and sent far less frequently (once every few days or months). The ECM PID is indicated in the conditional access table (CAT) in encrypted form.

The format of ECMs and EMMs is not standardised, but is defined separately by each conditional access provider.

In one embodiment, the following additional USI is added to the ECM before broadcast by the head end system:

1) Place shifting status:

| Bit Value | Function |
|---|---|
| 00 | Place shifting freely allowed |
| 01 | Place shifting freely allowed within an authorised domain, only allowed outside the authorised domain with payment |
| 10 | Place shifting only allowed with payment |
| 11 | Place shifting not allowed |

2) Place shifting conditions, such as payment information (relevant when "place shifting status" is 01 or 10):
  a) One-off payment code, if any
  b) Subscription tier code(s), if any
  c) Per-channel subscription code(s), if any
  d) Other business model
  e) etc The fields from 2 (a) to 2 (e) are not necessarily mutually exclusive, and may be indicated simultaneously. For example, place shifting may be enabled for subscribers who have a suitable place shifting subscription to allow place shifting of all content, those who have chosen to subscribe to place shift the present channel only, and also for those who choose to place shift only the current event or program.

Additional subscriber data is preferably also added to the EMM before broadcast at the head end, detailing the place shifting payment status. This lists all place shifting subscription tier(s), per-channel subscription(s), one off payment code(s), etc which the subscriber has paid for.

This USI and subscriber information is preferably not transmitted "in the clear". The encryption and obfuscation methods employed by each individual CA system to other EMM and/or ECM data may also be applied to the place shifting related data. In the following description, it is assumed that the STB CAS has decrypted this data.

Figure 3:
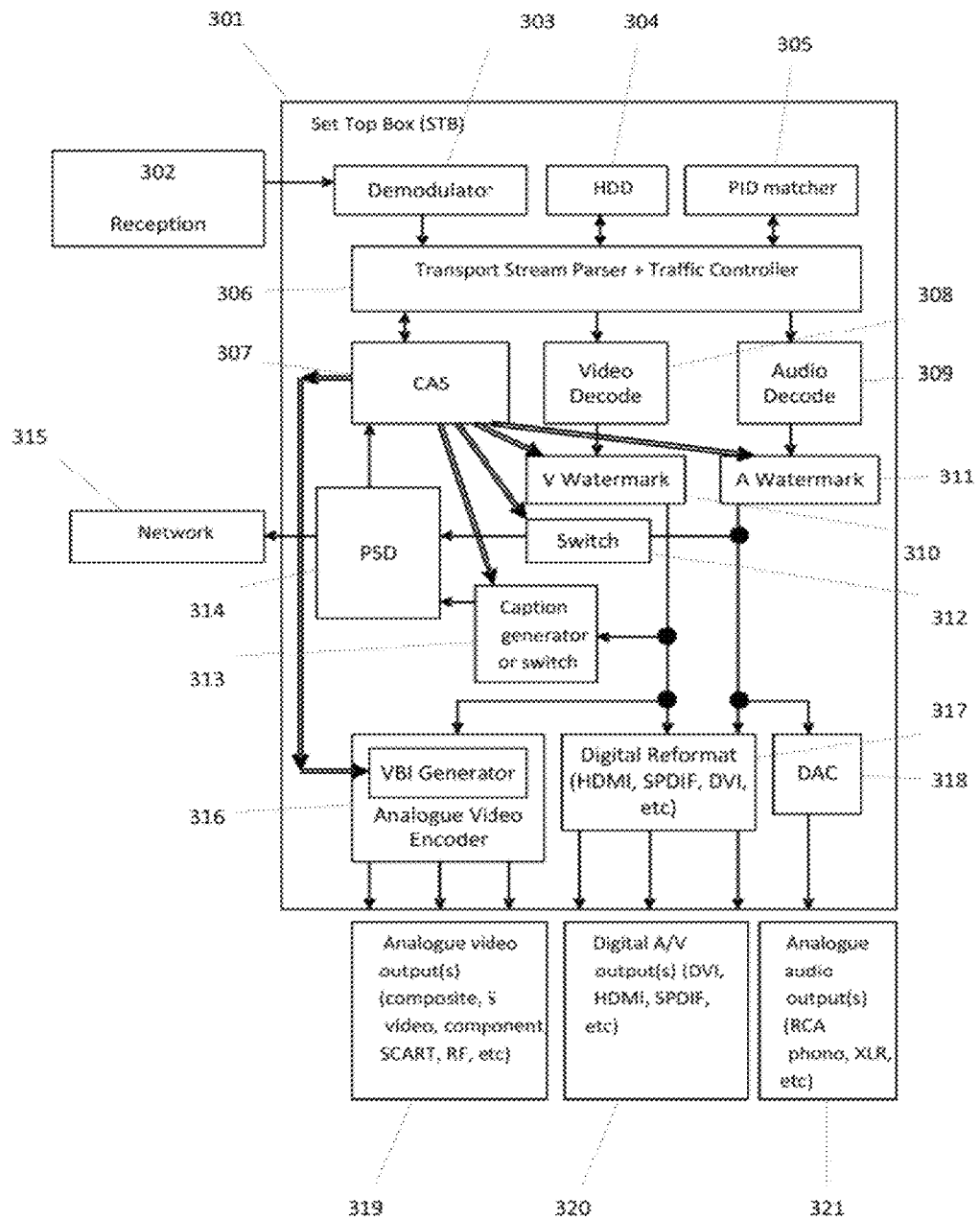
FIG. 3 is a diagram of a set top box in accordance with an embodiment of the present invention.

An STB 301 in accordance with an embodiment of the present invention is shown in FIG. 3. For the avoidance of doubt, FIG. 3 is a simplified diagram and some functions are not shown, or are combined with others. A broadcast from a head end device, such as the one shown in FIG. 2, is received at a receiving device 302 such as a satellite dish, aerial, cable or modem. The demodulator 303 retrieves the encoded signal from the broadcast stream and passes this to the transport stream parser and traffic controller 306. The demodulator module 303 is assumed to include systems to perform all functions necessary to recover a transport stream from a broadcast signal, including tuning and error correction for example. The transport stream parser and traffic controller 306 uses the PID matcher 305 to route different packets as appropriate, including routing encrypted packets via the CAS 307, and decrypted packets from the CAS to the video decoder 308, audio decoder 309, and so on as appropriate. The CAS 307 undertakes the STB conditional access system functions for decrypting the ECM, EMM and content data as appropriate. The decoded audio and video can then be passed to an audio/video output module to be output to a display device such as a television. In FIG. 3, an analogue video encoder 316 and digital to analogue converter (DAC) 318 are used for this purpose. The STB may also include a digital reformat module 317 for reformatting the decoded audio/video into a different digital format for output as, for example, DVI, HDMI and/or SPDIF, via digital outputs 320. The network connection 315 provides connectivity to a network, such as the internet or a local network, and may also be coupled to other components of the STB if the STB itself receives content from the network. Place shifting functionality is provided by PSD module 314.

The CAS 307 in the PS-STB 301 examines the contents of each ECM received, and takes the following action:
i) In the event that no place shifting information is carried in the ECM, the CAS will act as if place shifting is freely allowed.
ii) In the event that information carried in the ECM indicates that place shifting is not allowed, the CAS will disable the place shifting functionality of the STB, or replace the video input to the PSD with a caption, using caption generator 313, that informs the user that the current programme cannot be place shifted.
iii) In the event that information carried in the ECM indicates that place shifting is freely allowed, the CAS will take no action, or re-enable the place shifting functionality or remove the caption and restore the normal video input to the PSD.
iv) In the event that information carried in the ECM indicates that place shifting is allowed with payment, the CAS system will compare the place shifting payment data in the ECM with the place shifting payment status data in the most recently received EMM. Where a subscription tier, and/or a channel subscription, and/or a one-off payment code is found in the appropriate part of the EMM, they/it will be compared with the code(s) required by the current programme as indicated in the ECM. Where a match is found, place shifting functionality of the STB will be enabled. Where no match is found, the CAS will replace the video input to the PSD with a caption that informs the user that the current programme cannot be place shifted without payment.

The CAS 307 may retrieve the payment information from the ECM or EMM, from the head end 201, particularly a database 202 which may include billing and customer information, or a billing system, enabling the payment procedure to be completed using a standard procedure already in place for pay-per-view events. Alternatively the system may present the viewer with the details of a phone number to call to complete the transaction or it may send, link, or take the user to a relevant website to complete the transaction, preferably filling in one or more data fields automatically, where known.

When the viewer has completed the transaction to enable place shifting for the current media content, using whichever data exchange model chosen or applicable, then the element of the CAS 203 running in the head end will insert a new EMM for that subscriber into the transport stream, containing the appropriate code for the transaction that has taken place. The CAS 307 in the PS-STB will identify the new EMM, and act upon it; since at least one place shifting related code in the ECM should now match a code in the EMM, place shifting functionality will be re-enabled as described in section (iii) above.

v) In the event that place shifting is freely allowed within the authorised domain, but only allowed outside the authorised domain with payment, then the CAS 307 is arranged to communicate with the PSD 314 of the PS-STB to determine the location of the place shifting player to which it is place shifting content, or at least whether it is within the authorised domain or not.

Preferably the authorised domain may be a "home network" of the user, being a local network, such as network 105 in FIG. 1, which connects or couples to one or more devices 106 in a user's home or local vicinity. The devices may connect to the local network by a wired connection or wirelessly, typically using a local router to manage the connections. The authorised domain may instead be another definition as agreed between the PS-STB manufacturer and the Pay-TV provider and may include a predetermined geographical area for example.

The PSD module within the PS-STB is arranged to determine, if necessary by communicating with a place shifting system on the remote device, whether the communication link goes through the user's home gateway (e.g. broadband modem) out over the open internet, or is contained entirely within the owner's home network or other agreed authorised domain. The network address translation (NAT) traversal across the home gateway is an integral part of place shifting, and the PSD module can identify whether it is being accomplished or not. NAT is the process of modifying network address information in IP packet headers while in transit across a traffic routing device for the purpose of remapping one IP address space into another. Most systems using NAT do so in order to enable multiple devices on a private network to access the Internet using a single public IP address.

If a different definition of "authorised domain" is required then this may be determined using IP address, or location/tracking information fed back from the place shifting software on the remote device. The PSD in the PS-STB will communicate data indicating that the remote device is located "within authorised domain" or "outside authorised domain" to the CAS 307, and the CAS may proceed as described in section (ii) or (iv) above.

While this is one possible implementation, it will be appreciated that many others are possible within the scope of the invention. For example, the CAS may include systems for enabling and disabling functionality at various levels of granularity, and the place shifting status and payment information may be more compactly and securely communicated using this data format than the code described above. The Pay-TV operators may have highly developed subscriber management systems, subscriber authorisation systems, billing and payment mechanisms in place. In practice the headend and back-end management of place shifting payment could be handled by these systems in the same manner as all other payments, billing, and management.

In some systems, much of the USI and other metadata may be handled outside the CAS. Some Pay-TV operators make extensive use of private data to send information from their head end to their STBs, and handle this data in software/middleware/firmware. All the data described above could be carried in private data packets, and processed via the PS-STB software/middleware/firmware in a similar manner to that described above, thus providing the same functionality but without requiring any interface with, or use of, the CAS.

One or more of the functions described above taking place at the STB may instead take place at the head end. In an environment where the PS-STB is connected to the internet, or a suitable communication line such as a telephone line, the PS-STB system may be arranged to communicate directly with the head end via such a connection, and at least a portion of the data and payment checking can be moved to the head end system, leaving the PS-STB with the task of enabling or disabling place shifting at the behest of the head end, preferably with appropriate messaging being provided locally on-screen and/or sent via place shifting, or, for example, via a side channel, URL, or look up code, to the remote location. For example, the head end may compare an ECM containing program specific place shifting data with the EMM of a given STB and determine whether place shifting should be allowed. The head end may then communicate to the PS-STB whether place shifting should be permitted or not.

It will be appreciated that the broadcast itself could be via satellite, cable, terrestrial, IP, or other means. It will be further appreciated that, although MPEG-2 TS is a common transport mechanism, other methods are possible without changing the nature of the invention.

Although a preferred embodiment has been described in relation to a number of commercial options relating to the use of place shifting, it will be appreciated that other data exchange models are possible, and may be implemented with further metadata and/or software processing. It will also be appreciated that, in the event that some data exchange models or functions described above are not required, the functionality may be reduced. At its simplest, the embodiments of the invention may reduce to enabling/disabling place shifting, controlled by information received by whatever means from the service provider or authorised party.

The STB 301 of FIG. 3 also optionally includes one or more watermark units 310 and 311 for adding digital watermarks to the video and/or audio data. The watermark unit(s) may be arranged to add the watermark(s) before or after video/audio decoding, or at any other suitable point. In FIG. 3 the audio and video watermark units are arranged to apply the watermark after audio and video decoding. The units may be added only to the video/audio stream feeding analogue outputs, or may also, or alternatively, be applied to the video/audio stream feeding digital outputs, if re-conversion to analogue and subsequent place shifting is judged to be a significant possibility or content security threat. Where the audio is output without decoding, for example in Dolby Digital AC-3 format or any other suitable format, for subsequent processing outside the STB, then the audio watermark may be added in the AC-3 domain, or the audio may be decoded, have the watermark added, and then re-encoded, possibly to the same or different format, at the same or different bit-rate.

The watermark(s) may be encoded to contain data indicative of whether place shifting should be enabled or disabled for particular content. Separate control signals coming from the CAS to the watermark units 310 and 311, and to the caption generator 313, can be used. Alternatively, a binary arrangement in which "0=can place shift, 1=cannot place shift", could be used, with the watermark units being used to add a watermark when this bit is set at 1, and let the video though the switch when this is 0. Of course, the reversed binary arrangement could be used. The caption generator 313 in the video feed to the PSD may be replaced with a switch, such that the switches can be controlled with a single on/off control from the CAS 307. Preferably a NOT gate is included in the control connection to one or the other switch 312 or 313, such that a "cannot place shift" command corresponds to no video being sent to the PSD 314, whilst audio may still be sent. A single binary command line can therefore drive the whole arrangement, rather than relying on three separate control paths as shown on the diagram. It will be appreciated that if the switches in the audio and video paths (and/or caption generator in the video path) is/are present, then the audio and video signals sent to the place shifting module do not need to have the audio and video watermarks applied, since the place shifting functionality is controlled by the switches. However, it may be simpler to derive the place shifted content from the watermarked signals due to processing topology within the STB.

It will also be appreciated that if place shifting players enhanced according to embodiments of the invention are widely deployed, then the switch and caption generator functions of the PS-STB may not be required, since the watermarks may be used within the place shifting player to provide the same functionality. However, there is benefit to retaining both methods of controlling place shifting from the PS-STB, since relying exclusively on the place shifting player to deliver the functionality raises the possibility of hacked players accessing the content for free. It is of benefit to be able to accurately claim that a PS-STB completely disables its own in-built PSB on demand. With the switches and watermarks in use in the PS-STB a "hacker" would need a PS-STB, and a stand-alone PSD, and would also need to create or download hacked software for the place shifting player, in order to place shift the content freely.

In a PS-STB with recording functionality (e.g. a DVR or PVR), the appropriate USI is stored along with the recording on the memory, such as a hard disk drive 304, such that exactly the same functions as described herein can be applied to recorded media content as to those received "live" via broadcast. Where a user chooses to place shift a recorded programme, the CAS can receive a new EMM from a live stream with a suitable code to unlock the place shifting functionality, or from another source, such as from a secure web server, where a live feed containing an EMM is not available.

When content must not be place shifted, either because place shifting is prohibited completely, payment has not been received, or the user device is located outside the agreed region, the PSD in the PS-STB will respond accordingly, but this does not stop the user connecting a stand-alone PSD to a standard video output of the PS-STB. In this way, the user may place shift content that should not be place shifted.

To prevent this, the PS-STB may perform a number of additional functions. When the content must not be place shifted, the PS-STB may optionally add a signal to the non-picture area of the analogue video signal indicating this fact, and/or may add an invisible watermark to the picture area, and/or an inaudible watermark to the sound track, encoding data indicative of this fact. The signal and/or watermark may also include information on whether place shifting can be enabled if further conditions are met such as payment for the content, and how to make that payment.

The stand-alone PSD can be arranged to detect the signal in the non-picture area of the analogue video signal, and/or the watermark in the video and/or audio, and when it finds one of these elements present, it may prevent the video content from being place shifted. In addition, it may communicate with the place shifting player to pass on the information about payment. The place shifting player may display a caption, for example indicating "This programme cannot be Place Shifted. Please select another programme to continue viewing", or "To Place Shift this programme, please call 1-800-888-8888" etc.

The signal may be a proprietary signal carried in the vertical blanking interval (VBI) or in or around the horizontal sync pulse region, or use previously unused codes or bits in standard VBI signalling methods such as Wide Screen Signalling (ETSI EN-300-294, IEC-62375), CGMS-A (IEC-61880, CEA-805), Closed Captions (CEA-608), or teletext (ETS 300 706).

Further aspects of the watermark(s) relating to the stand alone place shifting device are described below.

Existing stand alone PSD may not be arranged to detect any signals or watermark(s) added to the video or audio they receive, and will therefore continue to place shift all content they receive regardless. To solve this problem, the place shifting player 106/108 may be equipped with one or more watermark detectors. Since the content is being place shifted successfully from the PS-STB, via the stand alone PSD to the place shifting player, the watermark(s) within the place shifted content are also received. When the watermark(s) are detected by the place shifting player, place shifting functionality is disabled within the player, and if a message is contained within the watermark(s) it is displayed on the place shifting player so that the user can pay to place shift the programme, or change channel for example.

The watermark must be sufficiently robust to withstand compression to a potentially low bit-rate by the PSD. It may be that a watermark containing a "Do Not Place Shift" flag (i.e. a single bit) is sent by one method, such as encoded in video or audio content, or via a method which takes a first time to decode, while the accompanying on-screen caption or message, consisting of several bytes (e.g. "Please phone 1-800-8888-888 to Place Shift this content") is sent within a different watermark by another method, for example encoded in audio or video, or via a method which takes a second time to decode, or trades off robustness against efficiency. Essentially the watermark data may be divided into two components, for example as two video watermarks or one video and one audio watermark. The first watermark containing the "Do Not Place Shift Flag", corresponding to a yes/no as to whether place shifting is permitted or not, is preferably robust (i.e. resistive to changes to the content), but its simplicity allows it to be quick to extract and/or decode. The additional watermark, containing further information, is also preferably robust, but due to the larger data content over the first watermark will likely be slower to extract and/or decode. To compensate, the additional watermark can be made less robust than the first watermark, with robustness being measured in any manner known to the skilled person determined according to the ability of the watermark to survive processing of content. The additional watermark can be less complex and therefore require less processing power to decode it.

The textual or graphical message does not necessarily need to be sent verbatim in the additional watermark. Preferably a simple reference code can be sent which corresponds to the Pay-TV operator, or a specific service tier or level or event related to a specific Pay-TV operator. Upon receiving the additional watermark, and decoding it to recover this code, the place shifting player can connect to a central server, submit the code, and receive the appropriate full message from the server. In this way, extensive information, links, intricate graphics or branding, and even executable code offering further functionality can be delivered to the place shifting player for the attention of the user, without having to transmit all this data via the watermark(s). Usefully, the reference code can be made unique to a particular portion of media content such as a single programme, based on ECM or other metadata received at the PS-STB and provided to the appropriate watermark unit. The code may also identify the user device or PS-STB from which it originated based on data stored on the PS-STB. The place shifting player can submit the code and receive the full message, for example, via the internet.

In the time between decoding the aspect of the watermark(s) that contains the simple instruction "do not place shift", and decoding the aspect of the watermark(s) that contains the full code, the place shifting player can overlay or replace the video with text informing the user that it is receiving further information, or some similar appropriate message. The place shifting player may have the capability of communicating with the PSD such that the units can work together to optimise the video and audio encoding for the network conditions. Some place shifting players and PSDs also allow manual control or override of some such parameters; when the place shifting player has decoded the "do not place shift" watermark, and is attempting to decode a further watermark (or aspect thereof), the place shifted player may assume manual control of the encoding parameters by sending a command to the PSD to cause the PSD to adjust its encoding parameters in a manner that makes the detection of the watermark more reliable, or speedy, or efficient. This could also be achieved by the place shifted player sending erroneous, incorrect, or misleading information on network performance back to the PSD. This adjustment to the encoding parameters may potentially be at the expense of subjective video or audio quality, but this drawback is unimportant as the video itself is not being presented to the user at this time, and the audio may also not be output, or may not need to be particularly high quality at this time. For example, for video content the video resolution and number of frames per second may usually be chosen to give a better viewing experience and therefore may be transmitted at a first resolution and a first number of frames per second. In order to allow quick reception, discovery and decode of a watermark it may be beneficial to switch to a second resolution and/or a second number of frames per second. Depending on the watermark to be decoded, it may be advantageous to change the transmission parameters to increase the resolution and decrease the number of frames per second and vice versa. The parameters may be specified for a given connection speed. For example, the best subjective viewing parameters may be a resolution of 320×240 at 15 fps, when a 300 kbps connection is available. In order to allow quick receipt, discovery and decode or a watermark it may be beneficial to switch to an increased resolution of 640×480 at 1 fps, still over the same 300 kbps connection, to give clearer reception of the watermark. The opposite, higher frame rate, lower resolution or quality, parameter change may be beneficial for some watermarks. With an audio encoded watermark similar parameters, such as bit rate, may be altered depending upon the watermark encoding scheme. Since the additional parameter/code watermark may be a different algorithm to the "do not place shift" watermark, or may be the same algorithm with different parameters, the detector may need to be controlled to switch to this algorithm or parameters after, or in response to, receiving the additional watermark containing the code corresponding to the on-screen message.

If the user decides to pay to place shift the content, usually by following the instructions provided to the place shifted player, then the "do not place shift" watermark is switched off in the PS-STB such as by inserting a new EMM for that subscriber into the transport stream, containing the appropriate code for the transaction that has taken place as described above. However, it may take the watermark detector in the place shifting player some time to recognise this fact, and so place shifting may be blocked for a short period after payment. This is undesirable, so a further optional feature is to send a "re-enable place shifting" signal from the PS-STB to the place shifting player, for example using a brief, extremely easily detected, watermark. This watermark may be comparatively fragile, or less robust than the "do not place shift" watermark, but as a result requires less processing to detect and decode. Alternatively, an in-the-clear audio or video signal (e.g. a sequence of tones, a bar code, etc which can also be detected instantly), or some other readily detectable signal that can be detected without undue processing may be used.

If the "re-enable place shifting" signal was fixed, i.e. the same signal was used each time a user paid to unlock place shifting, then the end user could intercept, capture and store this signal, for example by recording it onto a memory such as a DVD-R, and insert it into the audio or video content regularly to keep place shifting enabled. For example, the user could play a DVD containing the signal, and switch briefly from the output of the STB to the output of the DVD player every minute or so, to fool the place shifting player into allowing the content to be place shifted. Further, they could share the signal with other users to allow them to enable place shifting without payment. Therefore, preferably this watermark or signal is at least unique to a given user, and/or preferably related to, or derived from, the reference code retrieved from the additional watermark referencing a stored message described above, such that, ideally, the signal depends upon the individual user and/or the code for the specific event or programme that is being place shifted. Upon receipt of the watermark or signal the place shifting player can check that some or all of the data within the watermark or signal corresponds with a pre-stored value, and, if so, instantly unlock the place shifting functionality.

In particular, in order to select to pay to place shift the content, the user may do so by telephoning a number displayed on screen in the message, or visiting a website linked on screen, for example. Upon completion of the transaction, the head end will insert an EMM into the transport stream, upgrading the user's account status to allow place shifting of this content. Upon receipt of the EMM, the PS-STB will act as described previously, and also embeds the brief, watermark in the video carrying the "re-enable place shifting" instruction message. This message will preferably include an encrypted and/or hashed version of the user's identification code, being the unique code assigned to the PS-STB or another unique code assigned to the user, and the code previously carried in the audio watermark. The video watermark detector in the place shifting player will detect this watermark, and communicate it to the message generation, control, and retrieval unit 404. Here, the user's identification code and the code previously carried in the audio watermark are encrypted and/or hashed in the same manner as in the PS-STB, and the result is compared with that decoded from the "re-enable place shifting" video watermark. If there is a match, then place-shifting is re-enabled instantly, and any detection of a "do not place shift" watermark is ignored for a predetermined period of time over which the watermark detector may be expected to stabilise. This may depend on the algorithm in use, but typically between 10 seconds and 5 minutes may be allowed.

Alternatively, the code sent to unlock the place shifting functionality can be some other code that is known to the place shifting player. The code may be unique to a particular place shifting player, or may be generated within the player, and subsequently provided to the head end for communication to the PS-STB within an EMM, ECM or similar; for example, the code could be communicated to the user on-screen, so that the user may read the code to the operator, or input it to a billing/payment centre when paying to enable place shifting, and subsequently provided to the head end.

The advantage of relying on the place shifting player, rather than a PSD, to act upon an embedded signal, is that most place shifting players consist of a network connected device in which the place shifting functionality is implemented in software. This software can be designed to automatically check for updates, so that new features and improvements in performance can be deployed automatically. In this way, the functionality described herein can be downloaded to each place shifting player during a routine software update, thus ensuring that the content is treated as desired on all place shifting players, irrespective of the PSD, standalone or otherwise, with which they are communicating.

Figure 4:
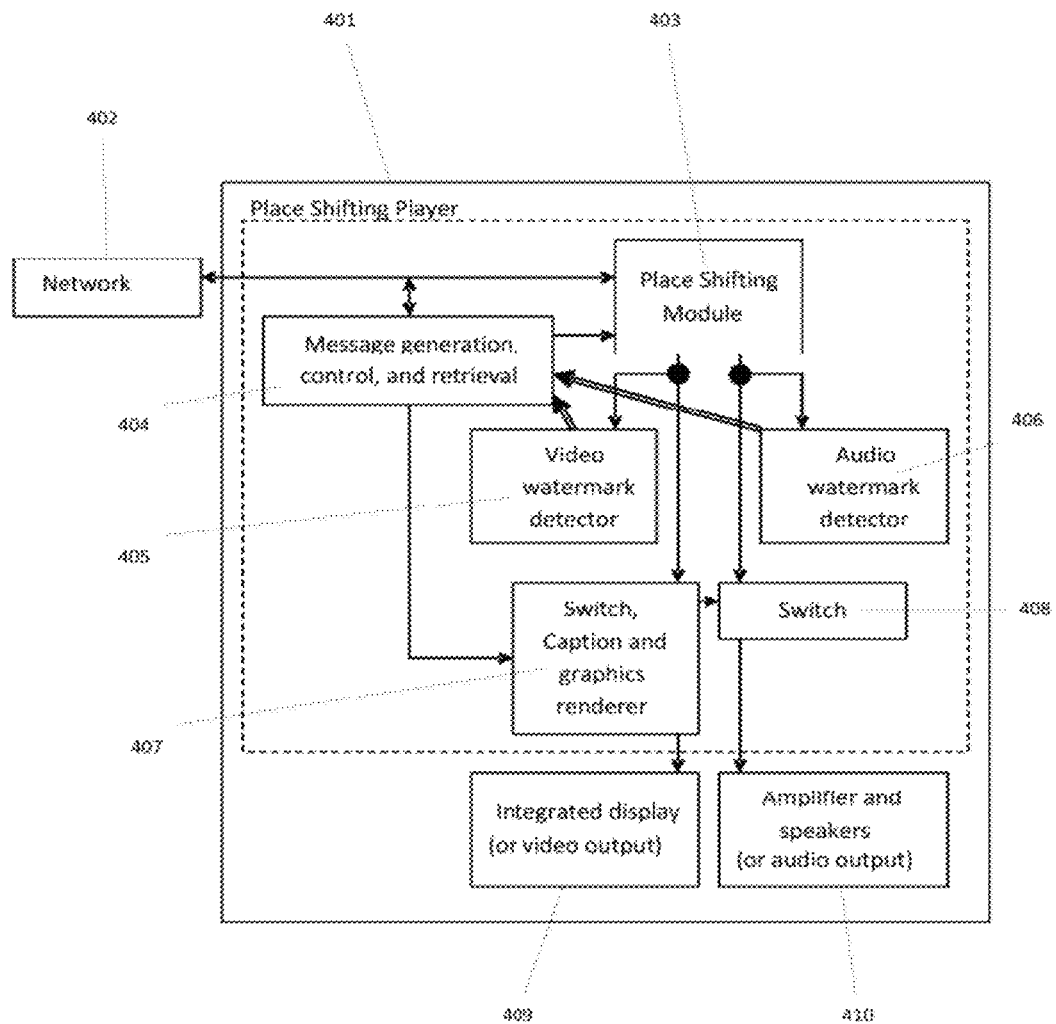
FIG. 4 shows an example place shifting player in accordance with an embodiment of the present invention.

FIG. 4 shows an example place shifting player in accordance with an embodiment of the present invention. The place shifting module 403 receives a signal from the network 402 containing the relevant content and associated data, and carries out management and processing of the basic place shifting functionality, to produce video and audio in digital form, encoded or decoded, as required, for output or for further processing.

In the example of FIG. 4, the "message generation, control, and retrieval" module 404 comprises a processor operating software to cause it to carry out the functions attributed to it below. It will be appreciated, as with all other components and functional units described herein, that it could be completed in hardware, software, or a combination of both. It will further be appreciated that some of the functions assigned to a particular component could be included in other components, such as processes integrated within the place shifting functions and/or watermark detector modules, while remaining within the scope of the present invention.

The video 405 and audio 406 watermark detectors detect the watermarks in the respective streams. In this example, the video watermark contains the "enable/disable place shifting" control which preferably consists of a single bit of data, such that the presence of the watermark means "disable place shifting", and the absence of the watermark by default means "enable place shifting", although this could be implemented the other way around. When the video watermark is detected, this status is passed on to the "message generation, control, and retrieval" module/functional unit 404 which generates a generic message that can be switched in to replace the place-shifted video content. At the same time as the place-shifted video content is switched off, the "message generation, control, and retrieval" function 404 communicates with the place shifting module 403 to alter the parameters of the place shifted audio, encoding to allow the audio watermark to be received as quickly as possible. In this example, the place-shifted audio is not switched off at this time, but allowed to continue so that the audio continues to be output, and the user is aware of the content that is being blocked.

In this example, the audio watermark contains a code which corresponds to an on-screen message from the Pay-TV operator. When the audio watermark is detected and decoded, the code is sent to the message generation, control, and retrieval unit 404 which contacts a known device, such as an information server or a local storage device internal to the player, to send the code, and receive the message in return. The address of the information server may be pre-programmed into the software on the place shifting player, and this software may be automatically updated.

The message, which may contain text and/or graphics and/or rich formatting data etc in a relevant language, for example, CE HTML or a single JPEG image, is passed to the caption and graphics renderer 407 to replace the generic message previously displayed. Preferably, at the same time or shortly afterwards, the place-shifted audio may also be switched off, enticing the user to follow the message to gain access to the content. Also, preferably at the same time or shortly after, the message generation, control, and retrieval function 404 communicates with the place shifting unit or function 403 to send a command to alter the parameters of the place shifting video encoding to allow any subsequent video watermark to be received as quickly as possible, while (if the chosen algorithm makes it beneficial) communicating with the video watermark detector to adjust its parameters ready to receive a "re-enable place shifting" watermark, should it arrive. For example, in the same way as described above when receiving the additional watermark, for video content the video resolution and number of frames per second may be chosen to give a better viewing experience and therefore may be transmitted at a first resolution and a first number of frames per second. In order to allow quick reception, discovery and decode of a watermark it may be beneficial to switch to a second resolution and/or a second number of frames per second. Depending on the watermark to be decoded, it may be advantageous to change the transmission parameters to increase the resolution and decrease the number of frames per second and vice versa. The parameters may be specified for a given connection speed. For example, the best subjective viewing parameters may be a resolution of 320×240 at 15 fps, when a 300 kbps connection is available. In order to allow quick receipt, discovery and decode or a watermark it may be beneficial to switch to an increased resolution of 640×480 at 1 fps, still over the same 300 kbps connection, to give clearer reception of the watermark. The opposite, higher frame rate, lower resolution or quality, parameter change may be beneficial for some watermarks. Since the "re-enable place shifting" watermark may be a different algorithm to the other watermarks, or may be the same algorithm with different parameters, the detector may need to be controlled to switch to the appropriate setting for this algorithm or parameters after, or in response to, receiving the additional watermark containing the code corresponding to the on-screen message.

Further embodiments of the invention may provide a complete system for outputting, place shifting and receiving and displaying place shifted content and a corresponding method. In particular, an embodiment of the invention may provide a system for controlling the distribution of media content comprising an embedding unit, a distribution system, a local user device and a remote user device. In particular, the embedding unit is arranged to embed, in a particular portion of media content, an indicator containing data indicative of whether the media content is authorised to be place shifted. The embedding unit may be located at the distribution system or at a location remote from it, and may be used by, for example, a content creator, or TV operator, who wishes to control the distribution of their content. The distribution system is preferably a head end system including a transmitter for broadcasting the media content, and may also optionally perform any of the tasks mentioned in relation to the head end system described above. The local user device comprises a place shifting device or unit for place shifting media content over a network, and has one or more inputs to receive media content from the distribution system and a user command to place shift the received media content to a remote user device, as well as an output to transmit the media content over a network. The local user device may be a PS-STB as described herein, or any other type of place shifting device. The remote user device includes an input to receive the media content and a processor arranged to determine, by analysing the embedded indicator, whether the received media content is authorised to be place shifted. The processor is also arranged to impair the output of content if the received media content is not authorised to be place shifted.

The distribution system is preferably a head end system including a transmitter for broadcasting the media content, and may also optionally perform any of the tasks mentioned in relation to the head end system described above. However, the distribution system may instead be a distributor or any other provider of media content on a storage device, such as a CD, DVD or any other type of storage, with the local user device being arranged to receive input from the storage device.

A corresponding method for controlling the distribution of media content may also be provided, the method comprising the steps of embedding, in the media content, an indicator indicative of whether the media content is authorised to be place shifted. The media content is sent from a distribution system, either before or after the indicator is added, to a local user device, the local user device comprising a place shifting device or unit for place shifting media content over a network. A user command is also received at the local user device to place shift the received media content to a remote user device and, in response, the method also includes the step of transmitting the media content to the remote user device over a network. The content is received at the remote user device which undertakes the steps of determining, by analysing the embedded indicator, whether the received media content is authorised to be place shifted and determining, and impairing the output of content if the received media content is not authorised to be place shifted. The embedding of the indicator may occur before the media content is broadcast by the head end system, and may optionally occur at the head end system or before the content is provided to the head end system by, for example, the content creator, or a TV operator.

The method may be implemented as a distributed computer program operating on each of the embedding unit, a head end system, a local user device and a remote user device.

It is clear that the indicator, which is preferably a watermark, would need to be arranged or created to be recognised by the remote user device to cause it to correctly determine whether content should or should not be place shifted.

Embodiments of the invention have been described in the context of a particular type of place shifting, but this should not be construed as limiting the scope of the invention. The term "place shifting" is intended to cover any method in which content from a first user device is re-transmitted over a network to a second user device, enabling the content to be consumed at a location remote from the first device.

Embodiments of the invention have been described in relation to set-top-boxes for receiving and descrambling broadcast video and accompanying audio data, particularly over the air or via satellite. It will be appreciated that the term set-top-box may be applied to any device for performing the function of receiving, decoding and outputting media content. This could include televisions with inbuilt set-top-boxes, appropriately programmed and connected computers and so forth. The invention could also conceivably be applied to audio only devices such as radios, including digital radios.

Embodiments of the invention may extend to delivery of content via methods other than broadcasting, including delivering the content on a physical medium such as a CD, DVD or any other type of storage media. In such embodiments, the storage medium may have the content and data associated with the received media content and indicative of whether the received media content is authorised to be place shifted, such as the USI, stored on it. This would allow control over place shifting functionality in devices that do not, or do not only, receive content by broadcast, such as DVD players or other devices that receive content from physical memory media. Such devices may be combined with place shifting functionality or coupled to a stand alone place shifting device according in the manner described above for STBs. The playback device could read and use the received data associated with the received media content in the same way as the PS-STB described above. For the arrangements that require watermarks to be added to the media content, such that place shifting players can identify whether content should be place shifted or not, the playback device may be provided with watermark encoders as described for the PS-STB. Alternatively, the content itself may be provided with the watermarks already embedded.

The invention has been described in the context of receiving audio and video by broadcast. The term "broadcasting" should be taken to encapsulate delivery of data by any form such as over the air, via the internet, cable or satellite or any other type of transmission. For the purposes of the present invention, unicast methods of content delivery could also be construed to fall within the meaning of broadcast, since multiple users can receive the same content.

The invention claimed is:

1. A method for controlling the place shifting of media content from a local user device that placeshifts media content over a network to a remote user device for outputting content to a user, the method comprising the steps of:
   receiving, at the local user device:
      media content from a broadcast source, wherein the media content comprises a plurality of different broadcast television programs; and
      a user command to cause place shifting of at least one television program of the received media content to the remote user device;
   receiving, at the local user device, a place shift enabled parameter containing data associated with the received media content and indicative of whether the television program is authorized to be place shifted;
   determining, by the local user device analyzing the place shift enabled parameter, whether the television program is authorized to be place shifted;
   allowing or impairing the place shifting of the television program from the local user device to the remote user device based on the determination;
   encoding, by the local user device, data comprising a first watermark in the media content that indicates whether the television program is authorized to be place shifted from the local user device; and
   when place shifting occurs, place shifting the television program including the first watermark for receipt by the remote user device.

2. A method according to claim 1 wherein allowing or impairing the place shifting of the television program includes allowing or preventing the place shifting of the television program to the remote user device.

3. A method according to claim 1 wherein allowing or impairing the place shifting of the television program includes marking the place shifted content such that the remote user device can determine whether the television program should be place shifted and take action to allow or prevent the display of place shifted content.

4. A method according to claim 1 further comprising the steps of:
   receiving, at the local user device, a condition parameter containing data indicative of one or more further conditions that must be met in order for television program to be place shifted by the local user device;
   determining, by accessing a database and comparing data from the database with the condition parameter, whether the one or more further conditions are met; and wherein
   the step of allowing or impairing place shifting is further based on whether the one or more further conditions are met; and
   wherein a condition that must be met includes the local device and the remote device being based in the same predetermined authorized domain, the method further comprising the steps of:
   determining whether the local device and the remote device are within the same predetermined authorized domain; and
   wherein a further condition that must be met includes the user having paid an adequate amount to receive place shifted content at the remote device, the method further comprising the steps of:
   receiving, from a database, data indicative of whether the user has paid for the service and, if it is determined that the user has paid for the service, allowing place shifting of media content.

5. A method according to claim 1 wherein if the place shifting of the television program is determined not to be permitted a caption is sent to the remote user device for display indicating one or more actions for the user to follow to activate place shifting functionality.

6. A method according to claim 1 wherein the local user device also comprises a memory for storing the placeshifted television program, the method further comprising:
storing television program on the memory;
storing the place shift enabled parameter data associated with the television program;
receiving a command to place shift the stored media content;
determining, by analyzing the associated data, whether the stored media content is authorized to be place shifted; and
enabling or disabling place shifting of the stored content to the remote user device based on the determination.

7. A method according to claim 1 further comprising the step of:
encoding in the received media content further data related to a message for display to a user, wherein the further data comprises a code associated with a message stored on another device applied in a second watermark; and
wherein the first watermark is encoded in a media content video component and the second watermark is encoded in a media content audio component or vice versa.

8. A method according to claim 1 wherein the method further comprises determining when the place shift enabled parameter changes from indicating that content cannot be place shifted to indicating that it can, and sending a re-enable signal to the remote user device that causes the place shifted content to be displayed on the remote device.

9. A method according to claim 1 further comprising the step of, when the place shift enabled parameter indicates that the television program cannot be place shifted, altering the place shift parameters of the video and/or audio such that the further data, or the re-enable signal, are received and decoded at the remote user device at a higher rate than the place shift parameters used during normal place shifting operation and wherein, altering the place shift parameters includes increasing or decreasing any of the video resolution and frame rate and the audio encoding rate.

10. A local user device for controlling the place shifting of received media content to a remote user device over a network, the local user device comprising:
one or more inputs for receiving:
media content from a broadcast source, the media content comprising a plurality of different broadcast television programs; and
a user command to cause place shifting of one or more of the received television programs from the local user device to the remote user device;
a network connection for providing television programs to the remote user device;
a processor operable to analyze the place shift enabled parameter associated with the television program and to determine whether the television program is authorized to be place shifted, and to issue a command to allow or impair the place shifting functionality depending upon the determination; and
a watermark encoder configured to encode data comprising a first watermark in the television program that is indicative of the whether the television program is authorized to be place shifted.

11. A method for controlling the place shifting of content to a remote user device, the method comprising the steps of:
receiving, at the remote user device:
place shifted media content from a local user device over a network, wherein the placeshifted media content comprises a media stream encoded by the local user device that encodes a television program with a first watermark, wherein the first watermark is indicative of whether the television program is authorized to be place shifted;
determining, by analyzing the first watermark, whether the television program is authorized to be place shifted; and
impairing the output of television program if the television program is not authorized to be place shifted.

12. A method according to claim 11 further comprising the step of detecting, at the remote user device, whether the first watermark is present or not, the presence or absence of the watermark being indicative of whether the television program is authorized to be place shifted; and
further comprising the step of receiving, encoded in the television program, an additional watermark containing further data related to a message for display to a user and preferably further comprising the steps of connecting to a database, submitting the further data, and receiving a message from the server and displaying the message to a user.

13. A method according to claim 11 wherein if the watermark indicates that content is not authorized to be place shifted, the video component of the television program is prevented from being output at the remote user device, and the audio component of the television program is output at the remote user device for a period of time or vice versa.

14. A method according to claim 11 wherein, when the watermark changes from indicating that television program cannot be place shifted to indicating that it can, receiving a further watermark at the remote user device having a re-enable signal instruction encoded therein that causes the place shifted content to be displayed on the remote device.

15. A method according to claim 14 further comprising the step of, when the watermark indicates that the television program cannot be place shifted, sending a command to the local user device to alter the place shift parameters of the video and/or audio such that the further data, related to a user message, or the re-enable instruction, are received and decoded at the remote user device at a higher rate than the place shift parameters used during normal operation and wherein altering the place shift parameters includes increasing or decreasing any of the video resolution and frame rate and the audio encoding rate.

16. A remote user device for controlling the place shifting of content received from a local user device over a network, the remote user device being arranged to receive place shifted content and comprising:
one or more inputs configured to receive place shifted media content from a local user device over a network, wherein the placeshifted media content comprises a television program selected from a plurality of television programs available from the local user device, wherein the placeshifted media content is encoded by the local user device to include an indicator associated with the received media content that is indicative of whether the received media content is authorized to be place shifted, the indicator being a first watermark encoded in the received media content generated by the local user device;
a watermark detector configured to detect the first watermark in the received media content; and
a processor operable to analyze the indicator and to determine whether the content is authorized to be place shifted, and to issue a command to impair the output of content if the received media content is not authorized to be place shifted.

17. A remote device according to claim 16 wherein the processor is arranged to impair the output of received content if a watermark is detected or not, the presence or absence of the watermark being indicative of whether the received media content is authorized to be place shifted; and wherein the watermark detector is further configured for detecting, in the received media content, an additional watermark containing further data related to a user message for display to a user containing the actions required to place shift the received media content; and wherein the processor is configured to connect to a database, to submit the further data to the database, to retrieve a message from the database and to display the retrieved message to a user.

18. A device according to claim 16 wherein the device is configured to determine if it is in the same predetermined authorized domain as the local user device and to prevent the display of received place shifted content if it is not in the same domain.

19. A device according to claim 16 arranged to receive a further watermark at the remote user device having a re-enable instruction encoded therein that causes the place shifted content to be displayed, the re-enable instruction overriding the place shift indicator.

\* \* \* \* \*